United States Patent
Soika et al.

(10) Patent No.: US 8,380,267 B2
(45) Date of Patent: Feb. 19, 2013

(54) SUPERCONDUCTING CABLE SYSTEM

(75) Inventors: Rainer Soika, Hannover (DE); Dipl. -Ing Klaus Schippl, Hannover (DE)

(73) Assignee: Nexans, Paris (FR)

( * ) Notice: Subject to any disclaimer, the term of this patent is extended or adjusted under 35 U.S.C. 154(b) by 10 days.

(21) Appl. No.: 12/966,447

(22) Filed: Dec. 13, 2010

(65) Prior Publication Data

US 2011/0160063 A1 Jun. 30, 2011

(30) Foreign Application Priority Data

Dec. 16, 2009 (EP) .................................... 09306240

(51) Int. Cl.
*H01B 12/00* (2006.01)
(52) U.S. Cl. ...................................................... 505/232
(58) Field of Classification Search .................. 505/230, 505/232, 886, 890, 897; 174/125.1
See application file for complete search history.

(56) References Cited

U.S. PATENT DOCUMENTS

| | | | | |
|---|---|---|---|---|
| 3,895,159 A | * | 7/1975 | Yoshimura | 442/224 |
| 3,929,247 A | * | 12/1975 | Borup | 220/560.15 |
| 3,941,272 A | * | 3/1976 | McLaughlin | 220/560.11 |
| 4,044,184 A | * | 8/1977 | Ashida et al. | 428/113 |
| 4,984,605 A | | 1/1991 | Schippl | |
| 2007/0220904 A1 | * | 9/2007 | Jibb et al. | 62/50.7 |
| 2008/0167845 A1 | * | 7/2008 | Hirose | 703/2 |

* cited by examiner

*Primary Examiner* — Colleen Dunn
(74) *Attorney, Agent, or Firm* — Sofer & Haroun, LLP

(57) ABSTRACT

A superconducting cable system in which at least one superconducting electrical cable is arranged in a cryostat which consists of two metallic tubes, which are arranged concentrically and at a distance from one another. Vacuum insulation is fitted in the circumferential gap formed by the distance between the tubes, which vacuum insulation consists of spaces composed of a material having low thermal conductivity and plastic films coated with a metal and having high reflectivity. The gap is evacuated. In addition, thermally insulating material (9) is arranged in the gap, and its thermally insulating characteristics are independent of the vacuum which is produced between the two tubes (5, 6).

3 Claims, 1 Drawing Sheet

SUPERCONDUCTING CABLE SYSTEM

RELATED APPLICATION

This application claims the benefit of priority from European Patent Application No. 09 306 240.4, filed on Dec. 16, 2009, the entirety of which are incorporated by reference.

BACKGROUND

1. Field of the Invention

The invention relates to a superconducting cable system.

2. Description of Related Art

One such cable system is described in EP 0 326 923 B1.

In a cable system such as this, the cryostat is used as a sheath for the at least one superconducting electrical cable and the connecting areas thereof in end terminations. The aim is to ensure that the temperature of the cryogenic medium carried therein is maintained in the long term, and over relatively long distances as well, without significant heating. One such medium is, for example, nitrogen which, for example, is introduced into the cryostat at a temperature between 67 K and 90 K.

According to the initially cited EP 0 326 923 B1, the cryostat consists of two tubes, which enclose a gap between them, are composed of stainless steel, and can also be corrugated transversely with respect to their longitudinal direction, in which gap spacers composed of a material having low thermal conductivity and of plastic films coated with a metal and having high reflectivity are arranged between the two tubes, which spaces reduce the radiated heat. The gap is also evacuated. As long as the vacuum exists, a cryostat such as this can carry out its functions. However, if it collapses, for example as a result of damage to the outer tube of the cryostat, a sufficient amount of heat is introduced into the cryostat such that the operational reliability of the cable system is no longer ensured. The superconducting cable must then be disconnected immediately from the power supply system in order to prevent an electrical flashover from occurring in the cable system, because gas bubbles are formed in the cooling medium, in particular in nitrogen, because of the heat that is introduced. A flashover such as this would lead to destruction of parts of the cable system. This would lead to considerable damage, particularly in an end termination. The superconducting cable cannot be used again until the cryostat has been repaired. This requires a correspondingly large amount of effort.

OBJECTS AND SUMMARY

The invention is based on the object of designing the initially described cable system such that it can continue to operate even when the cryostat is damaged.

The additional thermally insulating material ensures that, if the vacuum in the cryostat collapses, the heat which is introduced into the cable system is sufficiently little that it is still possible initially to continue to operate it reliably. The risk of destruction of the cable system by an electrical flashover is precluded, in particular because no gas bubbles are formed in the cooling medium. Sufficient time remains to switch the power transmission to a different path, before the superconducting cable is disconnected from the power supply system.

By way of example, suitable thermally insulating materials are polyurethane and, in particular, vacuum insulation panels which contain a highly porous, thermally insulating material which is surrounded in a hermetically sealed form by a film, and the space surrounded by the film is evacuated. By way of example, one such material is silicic acid.

BRIEF DESCRIPTION OF THE DRAWINGS

One exemplary embodiment of the subject matter according to the invention is illustrated in the drawings, in which.

DETAILED DESCRIPTION

Figure 1:
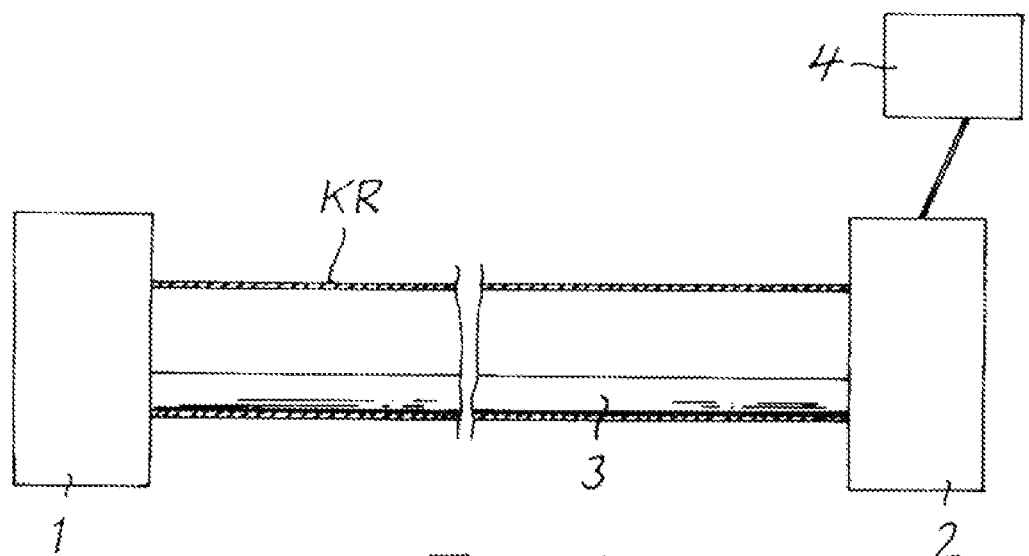
FIG. 1 shows a schematic illustration of a superconducting cable system according to the invention.

The cable system which is illustrated schematically in FIG. 1 has two end terminations 1 and 2, between which a superconducting cable 3 is arranged. In the end terminations 1 and 2, the cable 3 can be connected to a superconducting cable, which continues further, or to a normally conductive cable, or via an appropriately designed bushing to an electrical device. The configuration of the superconducting cable 3 and its electrical connection to parts which continue further are not of importance here. They will therefore not be described in anymore detail.

Figure 2:
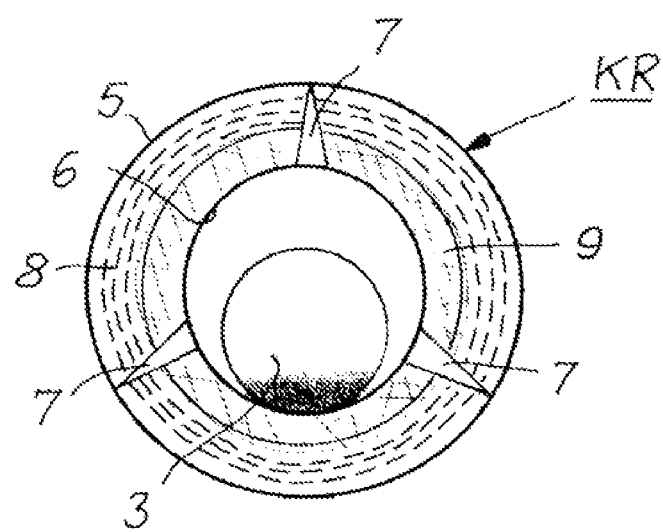
FIG. 2 shows a cross section through an enlarged illustration of a cryostat used in the cable system.

The superconducting cable 3 and the two end terminations 1 and 2 are surrounded by a cryostat KR whose design is shown, for example, in FIG. 2. By way of example, a cooling medium, which is present in a supply area 4, is fed into the cryostat KR, for example nitrogen, by means of which the superconducting conductor in the cable 3 is changed to the superconducting state, and is maintained in this state. This is ensured by the cryostat KR, in which the cable is accommodated on the path between the two end terminations 1 and 2. Two or more superconducting cables could also be arranged in the cryostat KR.

The cryostat KR consists of two metallic tubes 5 and 6 which are arranged concentrically at a distance from one another and between which there is a circumferential gap. The two tubes 5 and 6 are advantageously composed of stainless steel. They may also be corrugated transversely with respect to their longitudinal direction. A spacer 7, which is composed of a poorly thermally conductive material, is fitted in the gap between the two tubes 5 and 6 and holds the two tubes 5 and 6 concentrically with respect to one another over their entire length. The spacer 7 is advantageously in the form of a strand, which is arranged with a helical profile between the two tubes 5 and 6. It may also be designed differently, provided that the design ensures that thermally insulating material can be fitted without any gaps in the gap between the two tubes 5 and 6.

When the cryostat KR is fully functional, so-called superinsulation 8 is fitted in the gap between the two tubes 5 and 6, composed, for example, of plastic films coated with metal, for example aluminium, and in each case with non-woven material located between them. The superinsulation 8 is indicated in FIG. 2 by dashed lines running in a circular shape. The gap between the two tubes 5 and 6 is also evacuated.

In addition to the superinsulation 8, thermally insulating material 9 which is identified by the crosses drawn in FIG. 2, is fitted in the gap between the two tubes 5 and 6. There are no gaps in the insulating material 9 in the gap between the two tubes 5 and 6, and it largely fills this gap, together with the films of the superinsulation 8. It can be arranged above the superinsulation 8 or between the layers thereof. The insulating material 9 is advantageously located underneath the superinsulation 8, as is shown in FIG. 2.

By way of example, polyurethane or some other known thermally insulating materials can be used as the thermally insulating material 9. However, in one preferred embodiment, a highly porous material, such as silicic acid, is used, which is surrounded in a hermetically sealed manner by a film in a vacuum insulation panel, with the area which the film surrounds being evacuated. This vacuum is independent of the vacuum which exists in the gap between the two tubes 5 and 6. The vacuum is therefore maintained even if the vacuum in the gap collapses. The thermally insulating material 9 retains its characteristic even when the vacuum collapses, as a result of which the area surrounded by the cryostat KR is protected against sudden introduction of heat.

The invention claimed is:

1. Superconducting cable system, comprising:
   at least one superconducting electrical cable arranged in a cryostat, said cryostat formed by two metallic tubes arranged concentrically and at a distance from one another forming a circumferential gap formed by the distance between the tubes for providing, a vacuum space;
   in said circumferential gap, a first vacuum insulation is disposed, said vacuum insulation has spacers composed of a material having low thermal conductivity and of plastic films coated with a metal and having high reflectivity, with insulations that vary with respect to vacuum pressure within said vacuum space; and
   an additional layer of thermally insulating material, also disposed within said circumferential gap between the two metallic tubes aloe with said vacuum insulation, where said additional layer of insulating material has thermally insulating characteristics that do not vary with respect to said vacuum pressure within said vacuum space.

2. Cable system according to claim 1, wherein independently formed vacuum insulation panels are used as the additional layer of thermally insulating material.

3. Cable system according to claim 1, wherein polyurethane is used as the additional layer of thermally insulating material.

* * * * *

UNITED STATES PATENT AND TRADEMARK OFFICE
CERTIFICATE OF CORRECTION

PATENT NO. : 8,380,267 B2
APPLICATION NO. : 12/966447
DATED : February 19, 2013
INVENTOR(S) : Soika et al.

Page 1 of 1

It is certified that error appears in the above-identified patent and that said Letters Patent is hereby corrected as shown below:

In the Claims

Column 4 (Claim 1) Line 5: the word "insulations" should be "insulation"

Column 4 (Claim 1) Line 5: the word --properties-- should be inserted between the word "insulation" and the word "that"

Column 4 (Claim 1) Line 9: the word "aloe" should be "along"

Signed and Sealed this
Eleventh Day of June, 2013

Teresa Stanek Rea
*Acting Director of the United States Patent and Trademark Office*